United States Patent
Guelbenzu Michelena et al.

(10) Patent No.: US 11,387,657 B2
(45) Date of Patent: Jul. 12, 2022

(54) METHOD FOR CONTROLLING POWER RAMPS WITH PREDICTION IN INTERMITTENT POWER GENERATION PLANTS

(71) Applicant: ACCIONA ENERGIA, S.A., Sarriguren (ES)

(72) Inventors: Eugenio Guelbenzu Michelena, Sarriguren (ES); Asun Padros Razquin, Sarriguren (ES); Raquel Rojo Ochoa, Sarriguren (ES); Luis Marroyo Palomo, Sarriguren (ES); Javier Marcos Alvarez, Sarriguren (ES); Inigo De La Parra Laita, Sarriguren (ES); Miguel Garcia Solano, Sarriguren (ES)

(73) Assignee: ACCIONA ENERGIA, S.A., Navarra (ES)

( * ) Notice: Subject to any disclaimer, the term of this patent is extended or adjusted under 35 U.S.C. 154(b) by 233 days.

(21) Appl. No.: 16/627,012

(22) PCT Filed: Jun. 29, 2017

(86) PCT No.: PCT/ES2017/070472
§ 371 (c)(1),
(2) Date: Dec. 27, 2019

(87) PCT Pub. No.: WO2019/002636
PCT Pub. Date: Jan. 3, 2019

(65) Prior Publication Data
US 2020/0227921 A1    Jul. 16, 2020

(51) Int. Cl.
*H02J 3/38*    (2006.01)
*G05B 13/04*    (2006.01)
(Continued)

(52) U.S. Cl.
CPC ............ *H02J 3/381* (2013.01); *G05B 13/048* (2013.01); *H02J 3/32* (2013.01); *H02J 7/0048* (2020.01);
(Continued)

(58) Field of Classification Search
CPC .. H02J 3/381; H02J 3/32; H02J 7/0048; H02J 2203/20; H02J 2300/24; H02J 2300/28;
(Continued)

(56) References Cited

U.S. PATENT DOCUMENTS

2008/0179887 A1    7/2008    Kawazoe et al.
2016/0154397 A1*   6/2016    Guelbenzu Michelena ................ H02J 3/383
                                                                  700/295
(Continued)

FOREIGN PATENT DOCUMENTS

CL    2015003451 A1    8/2016
CN    102355006 A      2/2012
(Continued)

*Primary Examiner* — Charles R Kasenge
(74) *Attorney, Agent, or Firm* — Hayes Soloway P.C.

(57) ABSTRACT

The present invention relates to a method for controlling power ramps with prediction in intermittent power generation plants, such as, for example, a photovoltaic solar plant, which minimizes the storage capacity required for compliance with the maximum ramp requirements for power fluctuation as well as the cycling of said storage systems, thus extending its lifespan and also reducing associated energy losses, thus reducing investment costs in the plant, such that, in order to achieve the same maximum fluctuation ramp, a minor use is made of the energy storage system.

22 Claims, 5 Drawing Sheets

(51) Int. Cl.
*H02J 3/32* (2006.01)
*H02J 7/00* (2006.01)

(52) U.S. Cl.
CPC ....... *H02J 2203/20* (2020.01); *H02J 2300/24* (2020.01); *H02J 2300/28* (2020.01)

(58) Field of Classification Search
CPC ........ H02J 3/004; G05B 13/048; Y02E 40/70; Y02E 60/00; Y02E 10/56; Y02E 70/30; Y04S 10/50; Y04S 40/20
See application file for complete search history.

(56) References Cited

U.S. PATENT DOCUMENTS

2016/0241041 A1* 8/2016 Padros .................... H02J 3/383
2017/0102434 A1* 4/2017 Wenzel ................... H02J 3/383

FOREIGN PATENT DOCUMENTS

| EP | 3026774 A1 | 6/2016 |
| WO | 2016055540 A1 | 4/2016 |
| WO | 2016055658 A1 | 4/2016 |
| WO | 2017062913 A1 | 4/2017 |

* cited by examiner

METHOD FOR CONTROLLING POWER RAMPS WITH PREDICTION IN INTERMITTENT POWER GENERATION PLANTS

CROSS-REFERENCE TO RELATED APPLICATIONS AND PRIORITY

This patent application claims priority from PCT Patent Application No. PCT/ES2017/070472 filed Jun. 29, 2017. This patent application is herein incorporated by reference in its entirety.

OBJECT OF THE INVENTION

The present invention is included in the technical field of methods for controlling power ramps with prediction in intermittent power generation plants.

The object of the present invention is a method for controlling power ramps with prediction in intermittent power generation plants, such as, for example, a photovoltaic solar plant, which prevents the battery from being fully discharged, which would prevent the maximum admissible ramp requirements given by a grid code regulation, or other similar instrument, from being complied with, in addition to minimizing the cycling of said storage systems thereby reducing investment costs in the plant by carrying out a more rationalized use of the energy storage system, such that, in order to observe the same maximum fluctuation ramp, a minor use is made of the energy storage system.

BACKGROUND OF THE INVENTION

Photovoltaic (PV) solar energy production depends on the available global irradiance, which in turn, for a determined location, depends not only on the day of the year and the time of the day, but also on meteorological effects such as clouds or aerosols in the particular location of the photovoltaic panels.

Therefore, along any given day, photovoltaic solar energy will vary significantly. On a sunny day, for example, it will show a predictable variation because of the different levels of irradiance throughout the day and because of the different angles that the sun will form during the day with the photovoltaic solar panels depending on the type of tracking capacity they have.

On a cloudy day, the production will show additional variations, which can be much faster depending on the size of the photovoltaic plant, the shape of the clouds and the speed at which the clouds move over it, which results in the power curves being completely different for a clear day, a partly could day and a completely cloudy day.

Cloud cover is difficult to predict and fast in terms of its effects, so it causes fluctuations in the production of the photovoltaic plants that can cause problems in the stability of the electrical system. Power grid operators have conducted a number of investigations on the effects of fluctuations because, since they cannot be accurately predicted at present, the grid must be equipped with sufficient control capacity to absorb them. Maximum power variations in photovoltaic plants can reach up to 90% of the rated power in very short time intervals of less than one minute.

In the case of a wind farm, the wind resource obtained is also variable depending on the meteorological conditions, so the effects are similar to those present in photovoltaic plants, although with different dynamics and time schedules.

One of the ways of solving the problem created by power fluctuations is controlling the generation by limiting the maximum speed of power variation, typically with the maximum ramp value that the power variation may have in each control cycle. This requires predicting fluctuations and acting in advance by limiting the production of the plant. In order to predict fluctuations, it would be necessary to accurately assess the changes in the meteorological parameters that cause them. Poor prediction of weather variables and the effects thereof on plant production can cause great losses in this process and may justify investment in energy storage systems.

The way in which established regulations (Grid Codes) handle this problem is establishing maximum power variation ramps to the power being fed into the grid by intermittent power generation plants. This way, it can be ensured that the power variation of a plant, or a group of plants, does not exceed the dynamics with which other plants in the system can increase or reduce power, so that the balance between production and consumption is not altered each time.

In order to establish these values, possible power variation speed for thermal power plants, between 2.5%-10% of the rated power thereof per minute, which is part of the manageable generation, is usually taken as a reference. This ensures that the rest of the system, if equipped with sufficient control capacity, can respond to rapid power variations in intermittent power generation plants. Another option is considering that the aggregation of nearby plants will produce a variation in the power obtained as a sum of all of them, which is less than the variations of each individual plant (filtering effect through aggregation), so that it is possible to reduce the storage requirements.

Power storage plants can control the variation speed of the output by charging and discharging energy from storage systems. For example, a 1 MW-560 kWh battery system can be added to a 1.2 MWp plant, whereby plant output power variations can be controlled according to a maximum increase determined by the control system.

There are a number of strategies known in the state of the art used in solar and wind power plants and that have various storage technologies, wherein the usual way of controlling power fluctuations is storing the excess into the storage or transferring the deficit from the storage, so that when power increases occur, the battery is charged, so that the power being fed into the grid does not exhibit high variation speeds (ramps), whereas, when power drops occur, the battery supplies the power to keep up with the power being fed into the grid without high variation speeds (ramps), where this procedure can be carried out in different ways, obtaining different results.

The immediate way of doing this, referred to as Ramp Control, is by using a control algorithm which, in the time cycle being defined, establishes a charging or a discharging value for the storage system so that the next cycle does not contain any value with a deviation greater than that allowed by the maxim admissible ramp value. The drawback associated to this technique is that since the sign of the power change is not known, the target state of charge $SOC_{tar}(t)$ of the storage system is always set at around 50%, which requires the use of a battery twice the minimum size needed to limit the maximum given ramp.

European patent published under number EP3026774A1 discloses a method for the control of power ramps minimizing energy storage requirements in intermittent power generation plants for complying with a maximum admissible ramp value for the power being fed into the grid, $P_G(t)$, given by a grid code regulation, or any other instrument, by the intermittent power generation plant, wherein the method comprises:

a stage for calculating the maximum plant power, $P_{Max}(t)$, and the minimum plant power $P_{Min}(t)$ of the instantaneous power generated by the intermittent power generation plant P(t) the maximum plant power being, $P_{Max}(t)$ and the minimum plant power being, $P_{Min}(t)$, maximum and minimum power respectively can be produced in the intermittent power generation plant at that precise moment in time;

a stage for determining the maximum possible fluctuation that can occur in the instantaneous power generated by the intermittent power generation plant P(t), wherein the maximum possible fluctuation is one of the two following fluctuations: a positive fluctuation which is calculated between the instantaneous power P(t) and the maximum plant power $P_{Max}(t)$ and a negative fluctuation which is calculated between the instantaneous power P(t) and the minimum plant power $P_{Min}(t)$;

a stage for dynamically calculating the target state of charge, $SOC_{tar}(t)$, of an energy storage system required to support the maximum possible fluctuation; and a control stage wherein the state of charge SOC(t) of the energy storage system associated to the difference between the power being fed into the grid $P_G(t)$, and the instantaneous power generated by the intermittent power generation plant P(t), is modified in accordance with the target state of charge, $SOC_{tar}(t)$ if the previous value of the target state of charge, $SOC_{tar}(t-1)$, is not able to support the maximum possible fluctuation, or is not modified if the previous value of the target state of charge, $SOC_{tar}(t-1)$, is able to support the maximum possible fluctuation.

The main drawback of the method described in European patent EP3026774A1 is that, in calculating the target state of charge required for supporting the maximum possible fluctuation, the battery is prepared to support fluctuations, which in most cases do not occur, whereby the cycling of said battery increases considerably, reducing the lifespan thereof.

Also known is International application under publication number WO02016/055658A1 relating to a method for the state of charge management in battery systems, which enables calculating the maximum plant power, $P_{Max}(t)$, and the minimum plant power, $P_{Min}(t)$, based on a short-term prediction of the instantaneous power generated by the intermittent power generation plant, using short-term prediction, wherein the method comprises:

a stage for determining a present state of charge (SOC) of the BESS (Battery Energy Storage System), and a present output power P(t) of the renewable power source and of the BESS, a stage for comparing the present state of charge (SOC) with a target state of charge $SOC_{tar}$ depending on the present power generated P(t) and, a stage for controlling $P_{BESS}$ power based on the comparison.

The option of using prediction to calculate $P_{Max}(t)$ and $P_{Min}(t)$ enables reducing the cycling of the battery with respect to patent EP3026774A1.

Both the method described in EP3026774A1 and WO02016/055658A1 assess the need for modifying the SOC of the storage system in order to support maximum fluctuation as a function of the current SOC.

The method for controlling power ramps with prediction in intermittent power generation plants of the present invention solves all of the above drawbacks. i.e., reduction of cycling and compliance with the grid code or other instrument.

DESCRIPTION OF THE INVENTION

The present invention solves the indicated problem by means of a method for controlling power ramps with prediction in intermittent power generation plants, such as for example a photovoltaic solar plant, which avoids the battery from being completely discharged, which would prevent compliance with the maximum admissible ramp requirements given by a grid code regulation, or other similar document, in addition to minimizing the cycling of said storage systems, thereby reducing plant investment costs leading to a more rationalized use of the energy storage system, such that, in order to respect compliance with a same maximum fluctuation ramp, a minor use is made of the energy storage system.

Any of the strategies mentioned in the background of the invention section, assess the need to modify the SOC of the storage system to support maximum fluctuation depending on the current SOC. However, if the storage system is limiting a ramp in the generated power, P(t), this power, P(t), will be different from that fed into the grid, $P_G(t)$. The difference between the two powers is assigned to the battery, so the BESS SOC will evolve until the ramp control ends, or in other words, until the power generated P(t) is equal to the power fed into the grid $P_G(t)$. This evolution of the SOC must be taken into account and added to the current SOC in order to assess whether the BESS has sufficient energy to support the maximum possible fluctuation. The methods of the state of the art do not take this energy into account and, as has been found, there are times when the battery can be completely discharged. If the BESS is discharged, there is no control of possible fluctuations in P(t) and therefore the grid code is not being complied with. In the same way, the above applies for a positive fluctuation and the battery fully charged, thereby not being able to absorb more energy.

To overcome these drawbacks, the method for controlling power ramps with prediction in intermittent power generation plants, which minimizes energy storage requirements in intermittent power generation plants, guaranteeing at all times compliance with a maximum admissible ramp value for the power being fed into the grid, $P_G(t)$, given by a grid code regulation or other similar instrument, which also improves the lifespan and the losses of the storage system of the present invention, comprises:

a stage for calculating the maximum plant power, $P_{Max}(t)$, and the minimum plant power $P_{Min}(t)$, of the instantaneous power generated by the intermittent power generation plant, P(t), in a prediction time horizon, the maximum plant power being $P_{Max}(t)$, and the minimum plant power being $P_{Min}(t)$, the maximum and minimum power, respectively, being those that can be produced in the intermittent power generation plant time during that prediction time horizon;

a stage for determining the maximum possible fluctuation that can occur in the instantaneous power generated by the intermittent power generation plant, P(t), wherein the maximum possible fluctuation is one of the two following fluctuations: a positive fluctuation, calculated between the instantaneous power, P(t), and the maximum plant power, $P_{Max}(t)$, and a negative fluctuation calculated between the instantaneous power, P(t), and the minimum plant power, $P_{Min}(t)$;

a stage for dynamically calculating the state of charge of an energy storage system required to support the maximum possible fluctuation, $SOC_{mpf}(t)$; and a stage for determining a stabilized state of charge, $SOC_{sta}(t)$, of the storage system, wherein the stabilized state of charge, $SOC_{sta}(t)$, is calculated as the state of charge of the energy storage system required to support the maximum possible fluctuation, $SOC_{mpf}(t)$, plus a term that takes into account the energy required by the power being fed into the grid, $P_G(t)$, in order to achieve the instantaneous power, $P(t)$, generated by the intermittent power generation plant.

Preferably, the method further comprises a control stage wherein the state of charge, $SOC(t)$, of the energy storage system associated with the difference between the power being fed into the grid, $P_G(t)$, and the instantaneous power generated by the intermittent power generation plant, $P(t)$, is modified according to the stabilized state of charge, $SOC_{sta}(t)$, if the previous value of the stabilized state of charge, $SOC_{sta}(t-1)$, is not able to support the maximum possible fluctuation, or is not modified if the previous value of the stabilized state of charge, $SOC_{sta}(t-1)$, is capable of supporting the maximum possible fluctuation.

This way, in each t moment, the method calculates the energy required to achieve the maximum plant power, $P_{Max}(t)$ and the minimum power of the plant, $P_{Min}(t)$, in said prediction time horizon, such that if there is sufficient energy in the energy storage system, the state of charge, $SOC(t)$, of the energy storage system is not modified, whereas when there is insufficient energy in the energy storage system, the state of charge, $SOC(t)$, of the energy storage system is modified according to the stabilized state of charge, $SOC_{sta}(t)$.

Thus, in calculating the state of charge, $SOC(t)$, of the energy storage system according to the stabilized state of charge, $SOC_{sta}(t)$, the energy required by the power being fed into the grid $P_G(t)$ at said t moment in order to achieve the instantaneous power $P(t)$ generated by the intermittent power generation plant is taken into account, whereby the battery is never completely discharged. Similarly, the battery is never fully charged in order to avoid loss of energy that is not fed into the grid.

In addition, by calculating the stabilized state of charge of the energy storage system according to the state of charge required to support maximum possible fluctuation, $SOC_{mpf}(t)$, having calculated the maximum plant power, $P_{Max}(t)$, and the minimum plant power, $P_{Min}(t)$, in that prediction time horizon, the energy storage system is designed to support, with a very high degree of accuracy, the fluctuations that will later take place, whereby the cycling of said energy storage system is considerably reduced, increasing the lifespan thereof.

The invention takes into account that both (i) the conditions for controlling the fluctuation of the output plant power, and (ii) the conditions of the state of charge of the storage system can be dynamic, such that they can vary according to other parameters. Variation registers make sense when aware of the application and how intermittent power generation plants for renewable energies, object of the present invention, work.

Therefore, depending on the maximum plant power, $P_{Max}(t)$, and the minimum plant power, $P_{Min}(t)$, that can occur during this prediction time horizon, it is then possible to obtain the necessary SOC in order to smooth out any potential fluctuations, both positive and negative.

If the intermittent energy generation plant is a photovoltaic solar plant, the generated power of the instantaneous photovoltaic plant, $P_{PV}(t)$, for specific values of irradiance, $G(t)$, and temperature of the cell, $T_c(t)$, can easily be estimated with a parametric model of the photovoltaic plant under consideration, or, optionally, a non-parametric method can also be used. It is possible to estimate, in that prediction time horizon, the production limits of the photovoltaic plants, i.e., $P_{PV,Max}(t)$, and $P_{PV,Min}(t)$. These powers, $P_{PV,Max}(t)$, $P_{PV,Min}(t)$, represent both the maximum and the minimum power, respectively, that can be produced in the photovoltaic plant during that prediction time horizon.

If the intermittent power generation plant is a wind turbine or a wind farm, the instantaneous power generated by the wind turbine or the wind farm, $P_{WT}(t)$, for specific values of meteorological variables, such as wind speed, $\vec{v}w(t)$ and temperature, $T(t)$, or optionally with a non-parametric method, can easily be estimated in that prediction time horizon with a parametric model of the wind turbine in consideration, obtaining the production limits of the wind turbine, i.e., $P_{WT,Max}(t)$ and $P_{WT,Min}(t)$.

Thus, it is possible to calculate the maximum, positive or negative, power variation that can take place from the instantaneous power generated by the intermittent power generation plant, $P(t)$. Therefore, depending on actual instantaneous power, it is then possible to obtain the state of charge, $SOC(t)$, needed for absorbing or providing the necessary energy, depending on the nature of the fluctuation, either upward or downward, respectively.

Preferably, the stage for calculating the maximum plant power, $P_{Max}(t)$, and the minimum plant power, $P_{Min}(t)$ of the instantaneous power generated by the intermittent power generation plant, $P(t)$, during the prediction time horizon, is performed for each of a group of plants in order to calculate the maximum power, $P_{Max}(t)$, and the minimum power, $P_{Min}(t)$, of the group of plants.

Optionally, the method further comprises a stage for adjusting the dynamic component of the ramp defined as the rate at which the power in the plant must be modified in each control stage, according to the state of charge of the energy storage system, $SOC(t)$.

Optionally, the method further comprises an additional stage for calculating the error committed in the stage for calculating the maximum plant power, $P_{Max}(t)$, and the minimum plant power, $P_{Min}(t)$, of the instantaneous power generated by the intermittent power generation plant, $P(t)$, during the prediction time horizon, with respect to the instantaneous power values actually generated by the intermittent power generation plant $P(t)$.

The following table shows different parameters between the method of the present invention and the method of European patent EP3026774A1 as well as International application WO2016/055658A1. They show the improvement in the different parameters due to said method for the case in which the energy storage system is a battery.

| MERIT INDICES | EP3026774A1 | WO2016/055658A1 | Invention |
|---|---|---|---|
| Capacity $C_{BAT}$ (h) | 0.32 | 0.32 | 0.32 |
| Storage System Losses (% Total Production) | 0.47 | 0.47 | 0.31 |
| Occasional battery discharges without prediction (non-compliance with ramps) | Yes | Yes | No |

| MERIT INDICES | EP3026774A1 | WO2016/055658A1 | Invention |
|---|---|---|---|
| Occasional battery discharges with prediction (non-compliance with ramps) | — | Yes | No |
| Cycling degradation for prediction time horizons between 15 and 180 min (annual %) | 2.56 | 1.1-5.26 | 1.03-1.73 |

Therefore, the method of the present invention enables the BESS not to discharge completely (and hence the grid code, or other instrument, would be complied with) contrary to the methods found in European patent EP3026774A1 and International application WO02016/055658A1. In addition, it enables cycling degradation to be as much as 57% less that that obtained with the method found in European patent EP3026774A1, as well as a reduction of associated losses.

Situations with prediction horizons of less than 15 minutes have not been taken into account, since, because of the short range, the control does not have enough time to take the SOC to the $SOC_{tar}$.

DESCRIPTION OF THE DRAWINGS

To implement the present description and for the purpose of providing a better understanding of the characteristics of the invention, according to a preferred embodiment thereof, a set of drawings is attached as an integral part of said description, which by way of illustration and not limitation represent the following:

FIG. 2 shows a graph depicting the stage for dynamically calculating the state of charge of the energy storage system required for supporting the maximum possible fluctuation $SOC_{mpf}(t)$ according to the method presented in patent application EP3026774A1 (without prediction). It shows how the SOC becomes negative, which implies that the BESS is completely discharged, the ramp limitation would be lost and therefore the grid code would not be complied with.

FIG. 3 shows a graph depicting the stage for dynamically calculating the state of charge of the energy storage system required to support the maximum possible fluctuation $SOC_{mpf}(t)$ according to the method presented in International application WO02016/055658A1, performing short-term prediction with a prediction time horizon (H) of 45 minutes. It shows how the SOC becomes negative, which implies that the BESS is completely discharged, the ability to limit ramps would be lost and therefore the grid code would not be complied with.

FIG. 4 shows a graph depicting the stage for determining the stabilized state of charge, $SOC_{sta}(t)$, according to the present invention, of the storage system performing short-term prediction, with a prediction time horizon (H) of 45 minutes. The values shown in FIG. 3 are represented by dashed lines. It shows how the BESS does not discharge now and therefore the grid code is complied with.

PREFERRED EMBODIMENT OF THE INVENTION

A detailed explanation of a preferred embodiment of the invention is described hereinafter according to FIGS. 1 to 9 mentioned above.

The method for controlling power ramps with prediction in intermittent power generation plants that minimizes energy storage requirements in intermittent power generation plants, guaranteeing at all times compliance with a maximum admissible ramp value for the power being fed into the grid, PG(t), given by a GRID CODE regulation, or another instrument, which also improves the lifespan and losses of the storage system, which can be applied to, for example, a photovoltaic solar plant, and wherein the energy storage system is, for example, a battery, comprises:

a stage for calculating the maximum plant power, $P_{Max}(t)$, and the minimum plant power, $P_{Min}(t)$, of the instantaneous power generated by the intermittent power generation plant, P(t), in a prediction time horizon, the maximum plant power being, $P_{Max}(t)$, and the minimum plant power being, $P_{Min}(t)$, the maximum and minimum power, respectively, being those that can be produced in the intermittent power generation time during that prediction time horizon;

a stage for determining the maximum possible fluctuation that can occur in the instantaneous power generated by the intermittent power generation plant P(t), wherein the maximum possible fluctuation is one of the two following fluctuations: a positive fluctuation which is calculated between the instantaneous power P(t) and the maximum plant power, $P_{Max}(t)$, and a negative fluctuation which is calculated between the instantaneous power, P(t), and the minimum plant power, $P_{Min}(t)$;

a stage for dynamically calculating the state of charge of the energy storage system required to support the maximum possible fluctuation $SOC_{mpf}(t)$; and a stage for determining a stabilized state of charge, $SOC_{sta}(t)$, of the storage system, wherein the stabilized state of charge, $SOC_{sta}(t)$, is calculated as the state of charge of the energy storage system required to support the maximum possible fluctuation, $SOC_{mpf}(t)$, plus a term that takes into account the energy required by the power being fed into the grid, $P_G(t)$, in order to achieve the instantaneous power, P(t), generated by the intermittent power generation plant;

Preferably, the method further comprises a control stage wherein the state of charge, SOC(t), of the energy storage system associated with the difference between the power being fed into the grid, $P_G(t)$, and the instantaneous power generated by the intermittent power generation plant, P(t), is modified according to the stabilized state of charge, $SOC_{sta}(t)$, if the previous value of the stabilized state of charge, $SOC_{sta}(t-1)$, is not able to support the maximum possible fluctuation, or is not modified if the previous value of the stabilized state of charge, $SOC_{sta}(t-1)$, is capable of supporting the maximum possible fluctuation.

The method for controlling power ramps of the present invention, in addition to working with the minimum necessary storage, can reduce cycling by more than 50% with respect to the state of the art and thus double the lifespan of the storage system. The method is based on a control of the state of charge SOC(t) of the battery based on preferably short-term production prediction data, and more preferably on data of between 15 and 180 minutes. Particularly, in the first stage of the method, the maximum production limits $P_{Max}(t)$ and the minimum production limits $P_{Min}(t)$ that are going to take place within the prediction time horizon, are calculated instantaneously.

Figure 1:
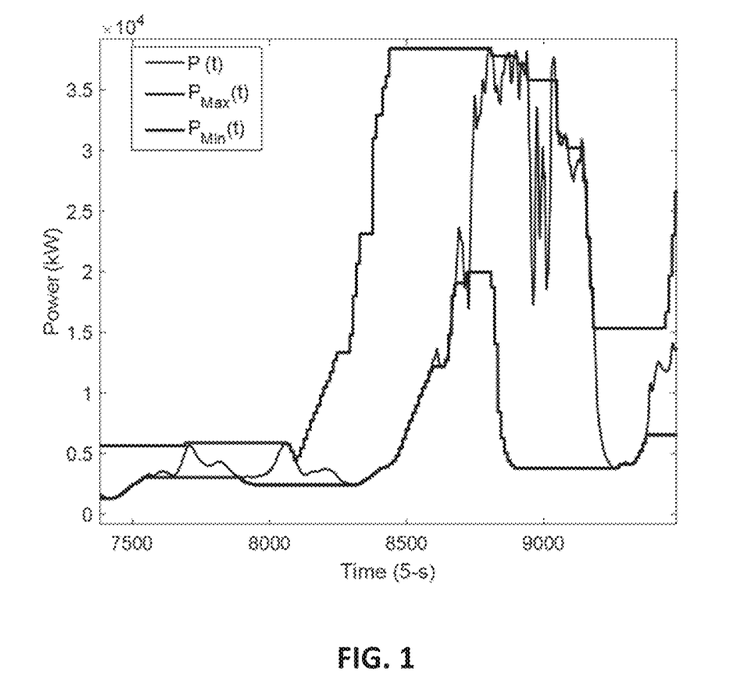
FIG. 1 show a graph of the stage in which the maximum $P_{Max}(t)$ and the minimum $P_{Min}(t)$ production limits are instantaneously calculated, which are set to occur during the prediction time horizon (H).

FIG. 1 shows a representation associated to said stage wherein the maximum production limits $P_{Max}(t)$ and the minimum production limits $P_{Min}(t)$ that are going to take place within the prediction time horizon (H), which in said FIG. 1 is 30 minutes, are calculated instantaneously. This prediction time horizon (H) shifts with time such that for each moment of time t, maximum production limits $P_{Max}(t)$ and minimum production limits $P_{Min}(t)$ are obtained.

The method then determines the maximum possible fluctuation that can occur in the instantaneous power generated by the intermittent power generation plant, P(t), in said prediction time horizon, wherein the maximum possible fluctuation is one of the two following fluctuations: a positive fluctuation, calculated between the instantaneous power P(t) and the maximum plant power, $P_{Max}(t)$, and a negative fluctuation, calculated between the instantaneous power P(t) and the minimum plant power, $P_{Min}(t)$.

Next, the method dynamically calculates the state of charge of the energy storage system required to support the maximum possible fluctuation $SOC_{mpf}(t)$.

Figure 2:
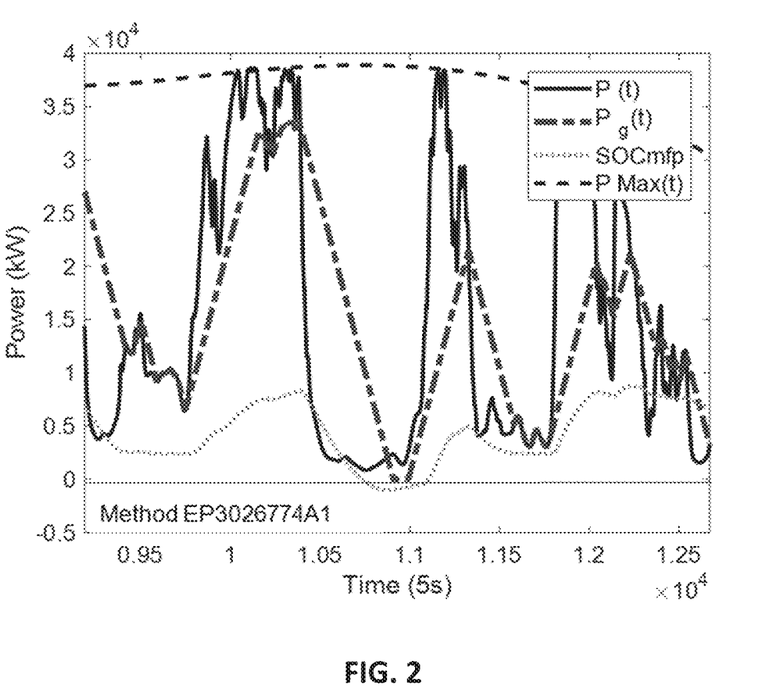

FIG. 2 shows a graph depicting the stage for dynamically calculating the state of charge of the energy storage system required to support the maximum possible fluctuation $SOC_{mpf}(t)$. Said FIG. 2 represents the value of the state of charge of the energy storage system required to support the maximum possible fluctuation $SOC_{mpf}(t)$. Up to this stage, the method of the present invention would be that of the method found in patent application EP3026774A1.

Figure 3:
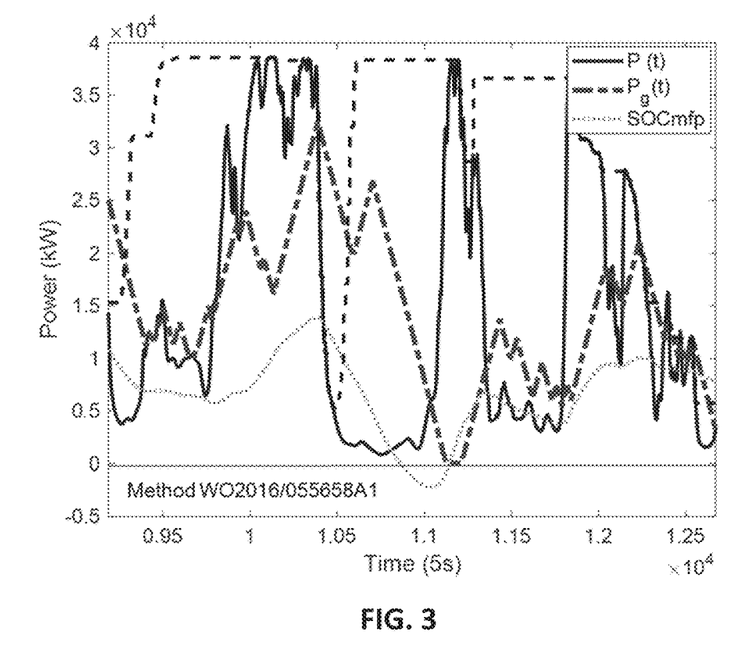

FIG. 3 shows a graph depicting the stage for dynamically calculating the state of charge of the energy storage system required to support the maximum possible fluctuation $SOC_{mpf}(t)$. Said FIG. 3 represents the value of the state of charge of the energy storage system required to support the maximum possible fluctuation $SOC_{mpf}(t)$, by carrying out a short-term prediction with a prediction time horizon (H) of 45 minutes. Up to this stage, the method of the present invention would be the result of applying short-term prediction with a prediction time horizon to the method found in International application WO2016/055658A1.

FIGS. 2 and 3 show how the battery discharges completely, since there is an area wherein the state of charge of the energy storage system required to support the maximum possible fluctuation $SOC_{mpf}(t)$ is below 0%. This implies that the capacity for controlling ramps is lost and therefore the grid code would not be complied with.

The method of the present invention solves the problem associated with the discharge of the battery by means of a stage for determining a stabilized state of charge, $SOC_{sta}(t)$ of the storage system, wherein the stabilized state of charge, $SOC_{sta}(t)$, is calculated as the state of charge of the energy storage system required to support the maximum possible fluctuation $SOC_{mpf}(t)$, plus a term that takes into account the energy required by the power being fed into the grid, $P_G(t)$, in order to achieve the instantaneous power, P(t), generated by the intermittent power generation plant. Similarly, the battery is never fully charged in order to avoid loss of energy that is not fed into the grid.

Figure 4:
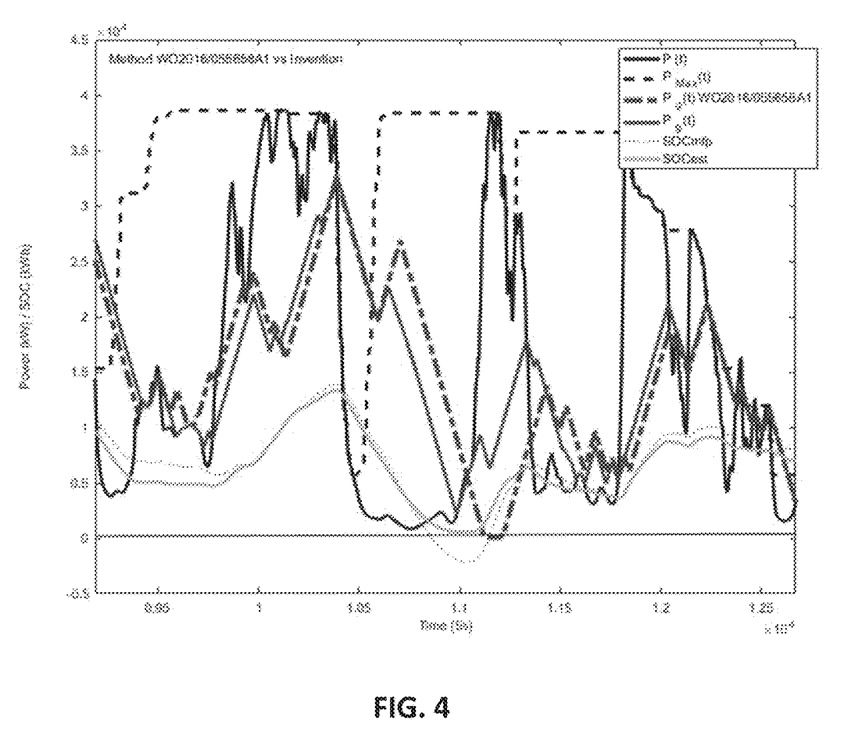

FIG. 4 shows a graph depicting the stage for determining the stabilized state of charge, $SOC_{sta}(t)$, of the storage system. Said FIG. 4 represents the value of the stabilized state of charge, $SOC_{sta}(t)$, of the storage system by carrying out a short-term prediction with a prediction time horizon (H) of 45 minutes. It shows that the battery never fully discharges, since there is no area wherein the stabilized state of charge, $SOC_{sta}(t)$, is below 0%. Therefore ramp control is complied with and thereby so is the grid code.

Figure 5:
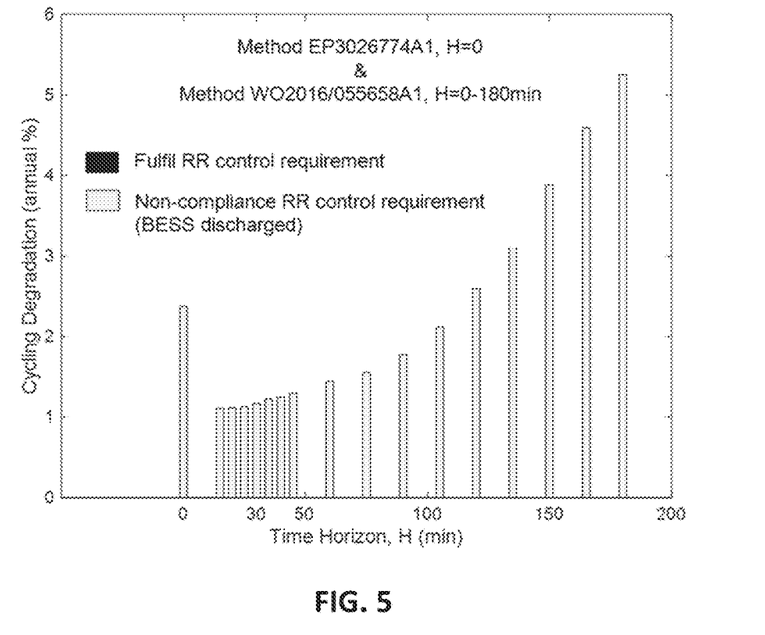
FIG. 5 shows a graph depicting the cycling degradation of the methods found in Patent application EP3026774A1 (without prediction, H equals zero) and those of the International application WO2016/055658A1 (without prediction, H equals zero, and between 15 and 180 min). In all the situations, the total discharge of the battery takes place in the same way as shown in FIG. 3 corresponding to a prediction time horizon (H) of 45 minutes and for prediction time horizons (H) of between 15 and 180 minutes, applying said horizon to the method found in International application WO2016/055658A1.

FIG. 5 shows a graph depicting cycling degradation in the methods found in patent application EP3026774A1 (without prediction, H equals zero) and International application WO02016/055658A1 (without prediction, H equals zero, and between 15 and 180 min). Said FIG. 5 shows how the battery discharges completely for all the prediction time horizons. This implies that ramp control is lost and therefore the grid code would not be complied with.

Figure 6:
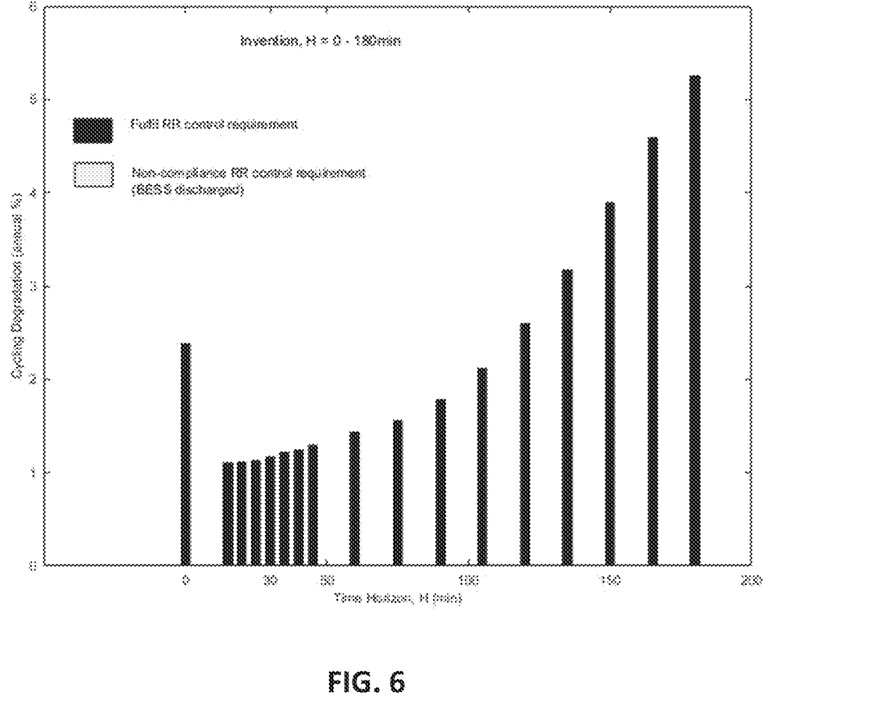
FIG. 6 shows a graph depicting cycling degradation for the graph depicted in FIG. 4 corresponding to a prediction time horizon (H) of 45 minutes and for prediction time horizons (H) of between 15 and 180 minutes, by applying the method of the present invention.

FIG. 6 shows a graph depicting cycling degradation for the graph in FIG. 4 for prediction time horizons (H) of between 15 and 180 minutes, by applying the method of the present invention. Said FIG. 6 shows how the battery is not completely discharged for any of the prediction time horizons. Therefore, ramp control and the associated grid code would be complied with.

Figure 7:
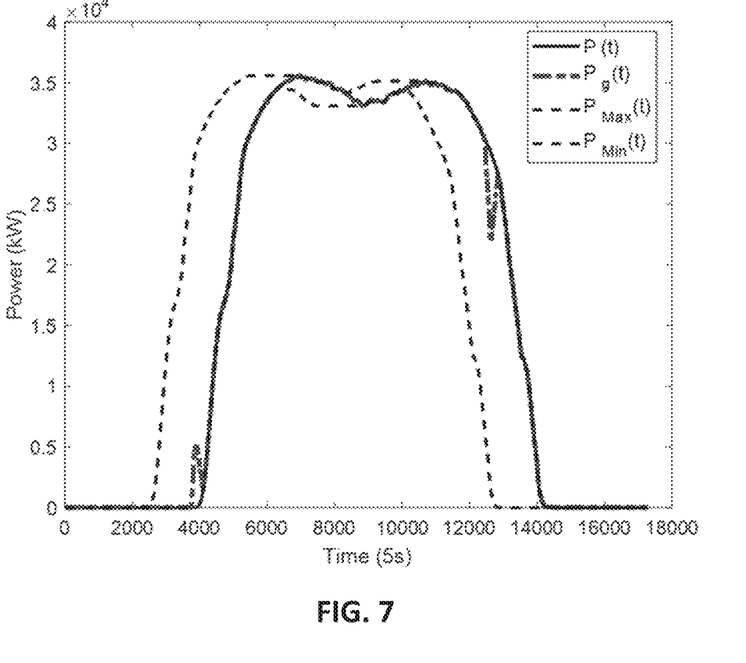
FIG. 7 shows a graph depicting certain inconsistencies presented by the method of the present invention when the day is clear, wherein peeks are observed in the calculation of the instantaneous power generated by the intermittent power generation plant, P(t), during the prediction time horizon, and which cause excessive cycling.

Said FIG. 6 shows that by applying the present invention with a battery, said battery presents high cycling degradation, which increases as the prediction time horizon increases (H). This is because the method of the present invention has certain inconsistencies when it is a clear day, as shown in FIG. 7, where peaks are observed in the calculation of the instantaneous power generated by the intermittent power generation plant, P(t), during the prediction time horizon, specifically, a peak at dawn, shown on the left side of the graph, and a peak at dusk, shown on the right side of the graph. In order to solve this high cycling degradation, which does not affect the state of charge of the battery, since at no moment is said battery completely discharged, the method of the present invention comprises an additional stage between the stage for calculating the maximum plant power, $P_{Max}(t)$, and the minimum plant power, $P_{Min}(t)$, of the instantaneous power generated by the intermittent power generation plant P(t), during a prediction time horizon, and the stage for determining the maximum possible fluctuation that can occur in the instantaneous power generated by the intermittent power generation plant, P(t), wherein said additional stage is a stage for correcting the maximum plant power, $P_{Max}(t)$, and the minimum plant power, $P_{Min}(t)$, of the instantaneous power generated by the intermittent power generation plant P(t), during the prediction time horizon.

Preferably, the stage for correcting the maximum plant power, $P_{Max}(t)$, and the minimum plant power, $P_{Min}(t)$, of the instantaneous power generated by the intermittent power generation plant P(t), during the prediction time horizon, corrects the minimum plant power $P_{Min}(t)$ at a moment of time around sunrise and corrects the maximum plant power, $P_{Max}(t)$ at a moment of time around sunset.

In the case of the correction of the minimum plant power, $P_{Min}(t)$, at the moment of time around sunrise, said correction must be carried out to avoid excessive cycling degradation of the battery, since it makes no sense that at any moment of the day, and at that particular moment during sunrise, the minimum plant power, $P_{Min}(t)$, exceeds the estimated power for a completely clear and cloudless day.

In the case of the correction of the maximum plant power, $P_{Max}(t)$, at the moment of time around sunset, said correction must be carried out to avoid excessive cycling degradation of the battery, since it makes no sense that at any moment of the day, and at that particular moment during sunset, the difference between the value of the estimated power for a completely clear and cloudless day and the value of the maximum plant power, $P_{Max}(t)$, exceeds the difference between the actual instantaneous power and the estimated power for a cloudy day.

Figure 8:
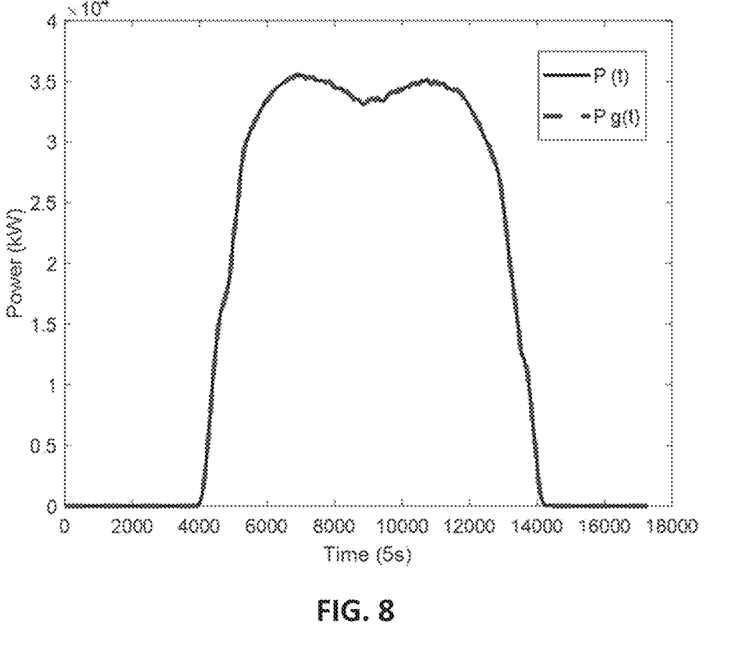
FIG. 8 shows a graph after applying the stage for correcting the maximum plant power, $P_{Max}(t)$, y and the minimum plant power, $P_{Min}(t)$, of the instantaneous power generated by the intermittent power generation plant, P(t), during the prediction time horizon, in the method of the present invention.

By implementing said stage for correcting the maximum plant power, $P_{Max}(t)$, and the minimum plant power $P_{Min}(t)$, of the instantaneous power generated by the intermittent power generation plant, P(t), during the prediction time horizon, into the method of the present invention, both the peak at sunrise and the peak at sunset are corrected, of the instantaneous power generated by the intermittent power generation plant, P(t), during the prediction time horizon, as shown in FIG. 8.

Figure 9:
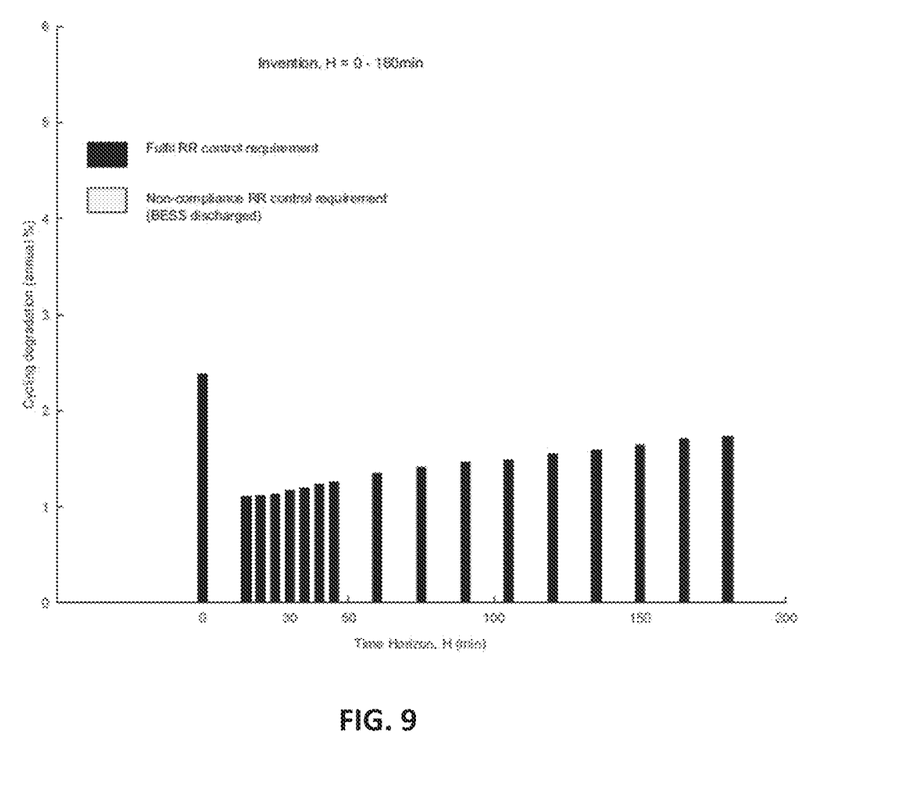
FIG. 9 shows a graph depicting the cycling degradation shown in FIG. 6 after applying the additional stage for correcting the maximum plant power, $P_{Max}(t)$, and the minimum plant power, $P_{Min}(t)$, of the instantaneous power generated by the intermittent power generation plant, P(t), during the prediction time horizon of the present invention. It can therefore be observed that in no case is the BESS completely discharged and the cycling degradation is inferior to the methods of the state of the art.

Thus, the method of the present invention with the additional stage for correcting the maximum plant power, $P_{Max}(t)$, and the minimum plant power $P_{Min}(t)$, of the instantaneous power generated by the intermittent power generation plant P(t), during the prediction time horizon, reduces cycling degradation of the battery, as shown in FIG. 9.

The following table shows the cycling degradation of the battery between the method of the present invention, by applying the additional stage for correcting the maximum plant power, $P_{Max}(t)$, and the minimum plant power, $P_{Min}(t)$, of the instantaneous power generated by the intermittent power generation plant, P(t), during the prediction time horizon, for different prediction time horizons, and the methods of European patent EP3026774A1 and International application WO02016/055658A1, wherein it shows that cycling degradation is improved for any prediction time horizon used in the present invention with respect to the methods used in European patent EP3026774A1 and International patent WO2016/055658A1.

| MERIT INDICES | EP3026774A1 | WO2016/055658A1 H = 15 min | | H = 180 min | Invention H = 15 min | | H = 180 min |
|---|---|---|---|---|---|---|---|
| Capacity $C_{BAT}$ (h) | 0.32 | 0.32 | ... | 0.32 | 0.32 | ... | 0.32 |
| Cycling degradation (annual %) | 2.56 | 1.1 | ... | 5.26 | 1.08 | ... | 1.73 |

In other words, at best, the battery would last approximately twice as long in terms of cycling when using the method of the present invention with respect to the methods found in European patent EP3026774A1 and International application WO2016/055658A1.

Optionally, the method further comprises an additional stage for calculating the error committed in the stage for calculating the maximum plant power, $P_{Max}(t)$, and the minimum plant power, $P_{Min}(t)$, of the instantaneous power generated by the intermittent power generation plant, P(t), during the prediction time horizon, with respect to the instantaneous power values actually generated by the intermittent power generation plant, P(t).

The method of the present invention can be combined with the method found in European patent EP3026774A1, included herein as reference, depending on the error calculated in the stage for calculating the error of the method of the present invention, such that if the calculated error exceeds a predetermined value, preferably in the range of 60%, more preferably it is 60%, the stage for controlling the state of charge, SOC(t), is the stage for controlling the target state of charge $SOC_{tar}(t)$ of European patent EP3026774A1, and vice versa, as long as the calculated error does not exceed the predetermined value, preferably in the range of 60%, more preferably it is 60%, the stage for controlling the state of charge, SOC(t), is the stage for controlling the stabilized state of charge, $SOC_{sta}(t)$, of the present invention.

The invention claimed is:

1. A method for controlling power ramps with prediction in intermittent power generation plants, which minimizes energy storage requirements in intermittent power generation plants guaranteeing at all times compliance with a maximum admissible ramp value for the power being fed into a grid, $P_G(t)$, given by a grid code regulation, or other instrument, wherein the method comprises:

a stage for calculating the maximum plant power, $P_{Max}(t)$, and the minimum plant power $P_{Min}(t)$, of the instantaneous power generated by the intermittent power generation plant, P(t), in a prediction time horizon, the maximum plant power being, $P_{Max}(t)$, and the minimum plant power being, $P_{Min}(t)$, the maximum and minimum power, respectively, being those that can be produced in the intermittent power generation time during that prediction time horizon, wherein in each t moment the energy required to achieve the maximum plant power, $P_{Max}(t)$, and the minimum power of the plant, $P_{Min}(t)$, is also calculated in said prediction time horizon;

a stage for determining the maximum possible fluctuation that can occur in the instantaneous power generated by the intermittent power generation plant, P(t), wherein the maximum possible fluctuation is one of the two following fluctuations: a positive fluctuation, calculated between the instantaneous power, P(t), and the maximum plant power, $P_{Max}(t)$, and a negative fluctuation calculated between the instantaneous power, P(t), and the minimum plant power, $P_{Min}(t)$;

a stage for dynamically calculating the state of charge of an energy storage system required to support the maximum possible fluctuation $SOC_{mpf}(t)$; and a stage for determining a stabilized state of charge, $SOC_{sta}(t)$, of the storage system, wherein the stabilized state of charge, $SOC_{sta}(t)$, is calculated as the state of charge of the energy storage system required to support the maximum possible fluctuation $SOC_{mpf}(t)$, plus a term that takes into account the energy required by the power being fed into the grid, $P_G(t)$, to reach the instantaneous power, P(t), generated by the intermittent power generation plant.

2. The method of claim 1, further comprising a control stage wherein the state of charge, SOC(t), of the energy storage system associated with the difference between the power being fed into the grid, $P_G(t)$, and the instantaneous power generated by the intermittent power generation plant, P(t), is modified according to the stabilized state of charge, $SOC_{sta}(t)$, if the previous value of the stabilized state of charge $SOC_{sta}(t-1)$, is not able to support the maximum possible fluctuation, or is not modified if the previous value of the stabilized state of charge, $SOC_{sta}(t-1)$, is capable of supporting the maximum possible fluctuation.

3. The method of claim 2, further comprising a stage for adjusting a dynamic component of the ramp defined as the rate at which the power in the plant must be modified in the control stage, according to the state of charge SOC(t) of the energy storage system.

4. The method of claim 2 further comprising an additional stage between the stage for calculating the maximum plant power, $P_{Max}(t)$, and the minimum plant power, $P_{Min}(t)$, of the instantaneous power generated by the intermittent power generation plant, P(t), during a prediction time horizon, and the stage for determining the maximum possible fluctuation that can occur in the instantaneous power generated by the intermittent power generation plant, P(t), wherein said additional stage is a stage for correcting the maximum plant power, $P_{Max}(t)$, and the minimum plant power, $P_{Min}(t)$, of the instantaneous power generated by the intermittent power generation plant, P(t), during the prediction time horizon.

5. The method of claim 4 wherein the maximum plant power, $P_{Max}(t)$ and/or the minimum plant power, $P_{Min}(t)$, are calculated through specific values of irradiance, G(t), and measured temperatures of the cell ($T_c$), or optionally, with a non-parametric method, in which the intermittent power generation plant is a photovoltaic plant.

6. The method of claim 4 wherein the maximum plant power, $P_{Max}(t)$, and/or the minimum plant power, $P_{Min}(t)$, are calculated through specific values of the following meteorological variables: wind speed, $\vec{v}w(t)$, and temperature, T(t), or optionally with a non-parametric method, in which the intermittent power generation plant is a wind turbine or a wind farm.

7. The method of claim 2 wherein the maximum plant power, $P_{Max}(t)$ and/or the minimum plant power, $P_{Min}(t)$, are calculated through specific values of irradiance, G(t), and measured temperatures of the cell ($T_c$), or optionally, with a non-parametric method, in which the intermittent power generation plant is a photovoltaic plant.

8. The method of claim 2 wherein the maximum plant power, $P_{Max}(t)$, and/or the minimum plant power, $P_{Min}(t)$, are calculated through specific values of the following meteorological variables: wind speed, $\vec{v}w(t)$, and temperature, T(t), or optionally with a non-parametric method, in which the intermittent power generation plant is a wind turbine or a wind farm.

9. The method of claim 2, wherein the stage for calculating the maximum plant power, $P_{Max}(t)$, and the minimum plant power, $P_{Min}(t)$, of the instantaneous power generated by the intermittent power generation plant, P(t), is performed for each of a group of plants in order to calculate the maximum power, $P_{Max}(t)$, and the minimum power, $P_{Min}(t)$, of the group of plants.

10. The method of claim 1, further comprising an additional stage between the stage for calculating the maximum plant power, $P_{Max}(t)$, and the minimum plant power, $P_{Min}(t)$, of the instantaneous power generated by the intermittent power generation plant, P(t), during a prediction time horizon, and the stage for determining the maximum possible fluctuation that can occur in the instantaneous power generated by the intermittent power generation plant, P(t), wherein said additional stage is a stage for correcting the maximum plant power, $P_{Max}(t)$, and the minimum plant power, $P_{Min}(t)$, of the instantaneous power generated by the intermittent power generation plant, P(t), during the prediction time horizon.

11. The method of claim 10 wherein the maximum plant power, $P_{Max}(t)$ and/or the minimum plant power, $P_{Min}(t)$, are calculated through specific values of irradiance, G(t), and measured temperatures of the cell ($T_c$), or optionally, with a non-parametric method, in which the intermittent power generation plant is a photovoltaic plant.

12. The method of claim 11, wherein the stage for correcting the maximum plant power, $P_{Max}(t)$, and the minimum plant power, $P_{Min}(t)$, of the instantaneous power generated by the intermittent power generation plant, P(t), during the prediction time horizon, corrects the minimum plant power, $P_{Min}(t)$, at a moment of time around sunrise and corrects the maximum plant power, $P_{Max}(t)$, at a moment of time around sunset.

13. The method of claim 10 wherein the maximum plant power, $P_{Max}(t)$, and/or the minimum plant power, $P_{Min}(t)$, are calculated through specific values of the following meteorological variables: wind speed, $\vec{v}w(t)$, and temperature, T(t), or optionally with a non-parametric method, in which the intermittent power generation plant is a wind turbine or a wind farm.

14. The method of claim 10, wherein the stage for calculating the maximum plant power, $P_{Max}(t)$, and the minimum plant power, $P_{Min}(t)$, of the instantaneous power generated by the intermittent power generation plant, P(t), is performed for each of a group of plants in order to calculate the maximum power, $P_{Max}(t)$, and the minimum power, $P_{Min}(t)$, of the group of plants.

15. The method of claim 1, wherein the maximum plant power, $P_{Max}(t)$ and/or the minimum plant power, $P_{Min}(t)$, are calculated through specific values of irradiance, G(t), and measured temperatures of the cell ($T_c$), or optionally, with a non-parametric method, in which the intermittent power generation plant is a photovoltaic plant.

16. The method of claim 1, wherein the maximum plant power, $P_{Max}(t)$, and/or the minimum plant power, $P_{Min}(t)$, are calculated through specific values of the following meteorological variables: wind speed, $\vec{v}w(t)$, and temperature, T(t), or optionally with a non-parametric method, in which the intermittent power generation plant is a wind turbine or a wind farm.

17. The method of claim 1, wherein the stage for calculating the maximum plant power, $P_{Max}(t)$, and the minimum plant power, $P_{Min}(t)$, of the instantaneous power generated by the intermittent power generation plant, P(t), is performed for each of a group of plants in order to calculate the maximum power, $P_{Max}(t)$, and the minimum power, $P_{Min}(t)$, of the group of plants.

18. The method of claim 1, further comprising an additional stage for calculating an error committed in the stage for calculating the maximum plant power, $P_{Max}(t)$, and the minimum plant power, $P_{Min}(t)$, of the instantaneous power generated by the intermittent power generation plant, P(t), during the prediction time horizon, with respect to the instantaneous power values actually generated by the intermittent power generation plant, P(t).

19. The method of claim 18, wherein:
if the calculated error exceeds a predetermined value, the method comprises as stage for controlling the state of charge, SOC(t), wherein the state of charge of the energy storage system required to support the maximum possible fluctuation, $SOC_{mpf}(t)$, is a target state of charge, $SOC_{tar}(t)$, and the method further comprises a control stage, wherein the state of charge, SOC(t), of the energy storage system associated with the difference between the power being fed into the grid, $P_G(t)$, and the instantaneous power generated by the intermittent power generation plant, P(t), is modified according to the target state of charge, $SOC_{tar}(t)$, if the previous value of the target state of charge, $SOC_{tar}(t-1)$, is not capable of supporting the maximum possible fluctuation, or is not modified if the previous target of charge, $SOC_{tar}(t-1)$, is capable of supporting the maximum possible fluctuation; while
if the calculated error in the stage for calculating error does not exceed the predetermined value, the method comprises a control stage wherein the state of charge, SOC(t), of the energy storage system associated with the difference between the power being fed into the grid, $P_G(t)$, and the instantaneous power generated by the intermittent power generation plant, P(t), is modified according to the stabilized state of charge, $SOC_{sta}(t)$, if the previous value of the stabilized state of charge $SOC_{sta}(t-1)$, is not able to support the maximum possible fluctuation, or is not modified if the previous value of the stabilized state of charge, $SOC_{sta}(t-1)$, is capable of supporting the maximum possible fluctuation.

20. The method of claim 19, wherein the predetermined value is in the range of 60%.

21. The method of claim 1, wherein in the stage for determining a stabilized state of charge, $SOC_{sta}(t)$, of the storage system, the calculation of the stabilized state of charge, $SOC_{sta}(t)$ as the state of charge of the energy storage system required to support the maximum possible fluctuation $SOC_{mpf}(t)$, plus a term that takes into account the energy required by the power being fed into the grid, $P_G(t)$, is calculated when a fluctuation occurs.

22. The method of claim 1, wherein in the stage for determining a stabilized state of charge, $SOC_{sta}(t)$, of the storage system, the calculation of the stabilized state of charge, $SOC_{sta}(t)$ as the state of charge of the energy storage system required to support the maximum possible fluctuation $SOC_{mpf}(t)$, plus a term that takes into account the energy required by the power being fed into the grid, $P_G(t)$, is calculated while the stabilized state of charge, $SOC_{sta}(t)$, is always maintained above 0%.

* * * * *